J. B. Fink.
Spindle Wrench.
Nº 87,833.         Patented Mar. 16, 1869.
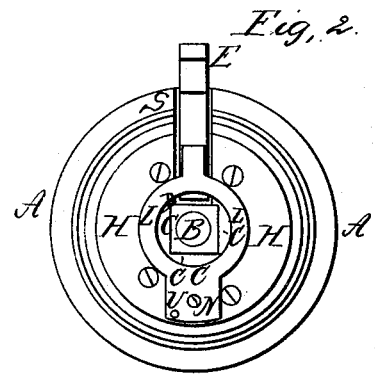
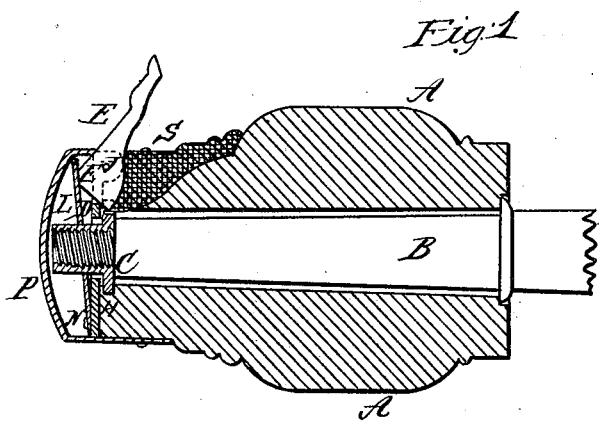
Witnesses,
Hatt R. Richard
J. B. Harsh.
Inventor,
John B. Fink,
for W. B. Richards, Atty.

JOHN B. FINK, OF FREEPORT, ILLINOIS.

Letters Patent No. 87,833, dated March 16, 1869.

IMPROVEMENT IN SPINDLE-WRENCH.

The Schedule referred to in these Letters Patent and making part of the same.

*To all whom it may concern:*

Be it known that I, JOHN B. FINK, of the city of Freeport, county of Stephenson, and State of Illinois, have invented certain new and useful Improvements in Spindle-Wrenches; and I do hereby declare that the following is a full, clear, and exact description of the same, reference being had to the accompanying drawings, making a part of this specification, in which—

Figure 1 is a longitudinal vertical sectional view.

Figure 2 is a front-end view, with the hub-band removed.

Similar letters of reference indicate corresponding parts in both figures.

The object of this invention is to provide means whereby the taps, or nuts, on the end of the spindles of any ordinary wheeled vehicles may be released, and the wheels taken off, without removing the dirt-tight hub-band, and without the ordinary wrench.

The invention consists in a clutch, pivoted in the ears of a plate on the end of the hub, and so arranged that it may engage with a notch in the spindle-nut, when it is raised, and be made to hold said nut, while the wheel is revolved, and the nut unscrewed; and, when the clutch or lever is thrown back into a recess in the hub, the nut will be released.

The invention also consists in a spring, combined with the above device, to hold the lever firmly in either the position for work, or the position at rest.

To enable others to understand the construction and operation of my invention, I will proceed to describe it with reference to the drawings.

A represents a hub.

B represents an ordinary spindle, in place in the hub A, and carrying the nut C, the nut C having a notch, D, in the flange.

H represents a flat plate, attached firmly to the end of the hub A, and having ears, (shown by the dotted lines J,) extending into a recess cut longitudinally with the hub.

E represents a lever, pivoted, as shown, between the ears J, in such manner, that when it is raised, as shown in the drawings, its lower end engages with the notch D in the nut C, and, in that position, it may be made to unscrew or to screw up the nut C, by revolving the wheel or hub A.

S represents a recess, cut in the hub A, and corresponding in shape to the lever E; and, when the lever E is thrown back into this recess, its lower end will be disengaged from the notch in the nut C, leaving the nut free to revolve the wheel without disturbing it.

L represents a spring, secured to the plate H by screw N.

This spring, at the upper end, fits against the flat part, E'', of the lever E, and holds the lever firm, while in the position shown in the drawings; and, when the lever is thrown back into the recess S, the spring L fits against its end, and holds it in that position.

P represents the hub-band, which, with this device, may be made all dirt-close, it having simply a slot in the rim, in which the lever E operates.

The upper surface of the lever E corresponds to the configuration of the hub A, and its cross-section corresponds to the cross-section of the recess S, so that, when the lever is thrown back into the recess, all will be snug and tight; and, when desired to remove the wheel from the spindle, it can be done instantly, almost, by simply raising the lever E, and turning the wheel.

What I claim as my invention, and desire to secure by Letters Patent, is—

The lever E, when pivoted in the ears J of the plate H, and operating in the notch D of the nut C, substantially as described, and arranged with the spring L, recess S in the hub A, and the spindle B, as described, and for the purpose set forth.

JOHN B. FINK.

Witnesses:
SAMUEL DIEMEN,
GEORGE WOLF.